Oct. 4, 1927.
A. ASSORATI
1,643,936
SNAP FASTENER
Filed Sept. 13, 1926
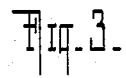
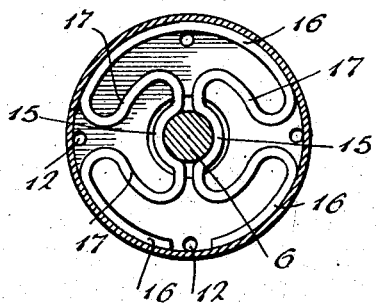
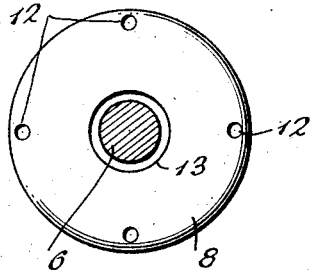
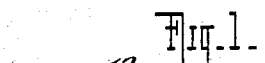
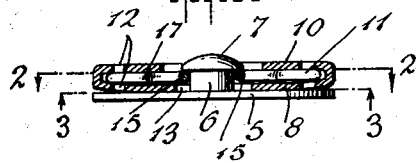
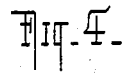
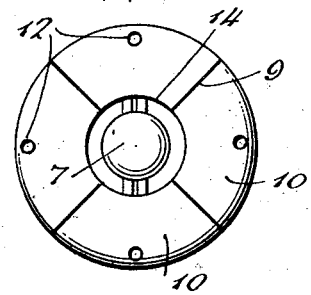
INVENTOR
ANTENOR ASSORATI
BY *Richards & Geier*
ATTORNEYS Patented Oct. 4, 1927.

1,643,936

UNITED STATES PATENT OFFICE.

ANTENOR ASSORATI, OF NEW YORK, N. Y.

SNAP FASTENER.

Application filed September 13, 1926. Serial No. 135,043.

This invention relates to improvements in fasteners, and has particular reference to the type generally known as snap fasteners.

It is known that snap fasteners have been made wherein the socket member has recessed therein a spring, the end portions of which engage on opposite sides of and project through the portion of the member forming the socket which receives the stud of the head member and thus engage said stud to releasably retain the socket and head members in fastened position.

When thus fastened together the size of the stud and its socket and the engagement of the spring only on opposite sides of the stud is such that very little, if any, play of the members relative to each other and coincident with a plane extending therebetween is permitted, with the result that any lateral strain upon either the socket or head members, or both, such as a strain occasioned by the bending of the wrist when the device is used as a glove fastener, is likely to inadvertently open the fastener due to the lack of play or relative movements between said members. This is especially true when the head and socket members are engaged in such manner that the ends of the spring which contact the stud are arranged transverse to the direction of strain.

An object of the present invention is to improve upon the type of fastener above referred to by so connecting the head and socket members and retaining the same in fastened position, that when a strain is applied to either or both members coincident with or parallel to a plane extending therebetween, said members will have sufficient relative lateral movement to overcome the tendency of the members to become inadvertently separated.

Another object is to engage the spring, which is utilized to lock the head and socket members together, with the stud of the head member in such manner that the spring will offer sufficient yielding resistance to a lateral or radial movement in any direction of either member relative to an axial line extending through said stud to prevent accidental detachment of said members.

The above and other objects will appear more clearly from the following detail description, when taken in connection with the accompanying drawing, which illustrates a preferred embodiment of the inventive idea.

In the drawing—

Figure 1 is a transverse section through the fastener constructed in accordance with the invention;

Figure 2 is a sectional view on the line 2—2 of Figure 1;

Figure 3 is a similar view on the line 3—3 of Figure 1; and

Figure 4 is a top plan view of the fastener.

The fastener, as shown in its preferred form, consists of a disk-like head member 5 adapted to be secured in the usual manner to a section of a garment, to a glove or any other article having separable portions capable of attachment to each other. The member is provided with a centrally disposed stud 6 having an enlarged head 7 which forms an annular flange about the stud with which is engaged the locking member to be presently described.

The cooperating socket member 8 may be stamped from a single flat piece of material cut along radial lines 9 at its periphery to form flaps 10 which are bent over the base of the member, as illustrated in Figures 1 and 4, to provide an enclosure or recess for the locking spring 11 and to retain the same in position within said member. Aligned apertures 12 are provided adjacent the periphery or margin of the member 8 in the base and flaps thereof by means of which said member may be attached, as by stitching or in any well known or approved manner, to a portion of a garment or other article. The base of the member is provided with an opening 13 of larger diameter than the head 7 so that when the stud is properly positioned in the socket member and engaged by the spring, as will be later described in detail, either member 5 or 8 will have considerable lateral play relative to the other in any direction coincident or parallel to a plane extending between the members. The inner free edges of the flaps 10, which are in a plane with the head 7, also form an opening 14 about said head which will permit of said lateral movement.

The locking spring 11 is made from a single length of wire bent intermediate its ends to form opposed circumferential stud engaging portions 15 which are normally disposed entirely within the plane of the wall of said opening 13 and which engage beneath the head 7 and practically encircle the stud 6 when the latter is inserted into the socket member. From each of the portions 15 the wire of which the spring is formed is extended and bent to provide the opposed arcuate retaining portions 16 which engage the inner periphery of the member 8 beneath the flaps 10 and which together extend substantially the entire distance around said periphery. The spring 11 is thus securely maintained in proper position and the convolutions 17 thereof between the portions 15 and 16 are so disposed that a pressure of or against the stud, by reason of a relative movement between the members 5 and 8, in any direction in a plane transverse to an axial line through said stud, will permit the portions 15 to yield and thus relieve the strain of said pressure, but at the same time both of said portions will, due to the resiliency thereof and their natural tendency to move toward each other, by reason of the convolutions 17, securely engage beneath the head 7 and thus prevent accidental detachment of the members 5 and 8. In connection with the relative movement above referred to, which may also be described as a movement of one of the members of the fastener in a plane parallel to the opposed face of the other member, it is to be noted that the diameter of the opening 13 is larger than the exterior diameter of the stud engaging portions 15, so that the stud 6 will be allowed considerable lateral movement relative to the wall of said opening without contacting the same. With fasteners of a type similar to the present invention, it has been found that the tendency of the members of the fasteners to become detached when any lateral strain is applied to either member is due to the fact that the studs have very little lateral movement relative to the openings through which they extend before they contact the walls of said openings with the result that any further pressure, after contact, against the unyielding walls of the openings causes the members of the fasteners to become separated. In contradistinction, the present construction avoids contact of the stud 6 with the wall of the opening 13 when a lateral pressure is applied to the stud, such as would occur when the fastener is used on a glove, and consequently said stud will not engage any unyielding surface which would otherwise tend to detach the same from its locking spring.

The members of the fastener may be secured to an article upon which they are to be used by any well known or approved manner. The form of the members may also vary according to the requirements.

What is claimed is:

A fastener of the type described including a head member having a stud, a socket member having an opening therein into which said stud is insertable, said opening being of such diameter relative to the stud as to permit of lateral movements of either member in any direction relative to an axial line through said stud, and a spring carried by said socket member and having two opposed circumferential stud engaging portions which combine to encircle the major portion of the circumference of said stud to offer a yielding resistance to said lateral movements in all directions and which are normally disposed entirely within the confines of the plane of the wall of said opening, said spring further having two opposed arcuate retaining portions disposed transversely to the first named portions and combining to extend almost completely about the periphery of said socket member, and the spring being further formed to provide convolutions connecting the ends of the stud engaging portions with the ends of said retaining portions.

In testimony whereof I have affixed my signature.

ANTENOR ASSORATI.